United States Patent [19]
Davidson

[11] Patent Number: 5,367,706
[45] Date of Patent: Nov. 29, 1994

[54] COLLAPSIBLE HEADNET

[76] Inventor: Norma J. Davidson, 8145 29th Ave. SW., Seattle, Wash. 98126

[21] Appl. No.: 92,881

[22] Filed: Jul. 19, 1993

[51] Int. Cl.$^5$ ............................................... A42B 1/20
[52] U.S. Cl. ......................................... 2/4; 2/171.03; 2/202; 2/209.11
[58] Field of Search ............... 2/4, 171, 171.03, 175.4, 2/175.5, 195.5, 195.6, 200.1, 202, 205, 206, 207, 209.11

[56] References Cited

U.S. PATENT DOCUMENTS

| 30,818 | 12/1860 | Haven | 2/4 |
| 41,957 | 3/1864 | Zengeler | 2/4 |
| 1,004,507 | 9/1911 | Walz | 2/4 |
| 2,495,041 | 1/1950 | Weiss | 2/209.11 |

FOREIGN PATENT DOCUMENTS 787503  9/1935  France ............................... 2/209.11

Primary Examiner—Clifford D. Crowder
Assistant Examiner—Diana L. Biefeld
Attorney, Agent, or Firm—Joan H. Pauly

[57] ABSTRACT

A collapsable, cylindrical, fabric mesh headnet for protecting a wearer's head from insects. The headnet includes an integral hoop located at mid height of the mesh tube. It keeps the mesh fabric away from the wearer's face when the tube is in place over the wearers head. The hoop is collapsable for storage by twisting and folding to form a plurality of concentric loop rings and layers of mesh fabric to substantially reduce the size of the head covering during storage. A drawstring is provided on the bottom edge of the covering to keep insects from entering there.

2 Claims, 1 Drawing Sheet

COLLAPSIBLE HEADNET

BACKGROUND OF THE INVENTION

1. FIELD OF INVENTION

The present invention relates to protective head coverings, and particularly to mosquito netting to protect wearer from flying insects.

2. DESCRIPTION OF PRIOR ART

In general, prior art head nets consist of either (1) a simple fabric mesh sack which, if worn over the head, does not adequately protect the wearer in all situations, or (2) of a fabric hat with mesh suspended from the brim and having a rigid metal or plastic ring at mid face level. Both of these also have a drawstring at the bottom, or neck area, to keep insects out. The head net with a rigid ring provides adequate protection from insects when worn, but is difficult to pack or carry in most situations when it is not being worn. In addition, a cloth hat currently sold in the Orient also includes a similar flexible circular member which can fold together to provide for storage. Reference cited, U.S. Pat. 4,815,784, Automobile Sunshade, uses a similar method of a collapsible rigid ring to hold fabric in place.

Accordingly, the prime objective of the subject invention is to provide a headnet which can be collapsed to a compact shape.

SUMMARY OF THE INVENTION

The subject invention is a headnet which is collapsible into a compact size when not in use. It is constructed of a fabric mesh tube, the mesh being commonly known as mosquito netting. When worn over a persons head, the headnet extends from the top of the head to the shoulders, and has a circumference enabling it to be worn over a hat or visor. The circular top of the cylinder is enclosed with the same mesh, and the bottom of the cylinder can be drawn up around the wearers neck with a drawstring. Near the mid point of the tube is a rigid, narrow, flexible hoop which is constructed of metal, plastic, or similar rigid material. It is enclosed in a fold in the fabric or otherwise attached with clips or stitching to permanently attach it to the fabric. In its extended size it will fit over a brimmed hat or a visor cap, but in its collapsed state it is compact.

The flexible ring is collapsable in similar fashion to the folding and storing of bandsaw blades for packaging and storage.

The invention is described in more detail below, with reference to the attached drawings.

DETAILED DESCRIPTION OF THE INVENTION

The subject invention is a headnet which comprises a stiff circular hoop which holds the netting away from the user's face, the hoop collapsible so that the headnet is made compact for carrying and storing.

Figure 4:
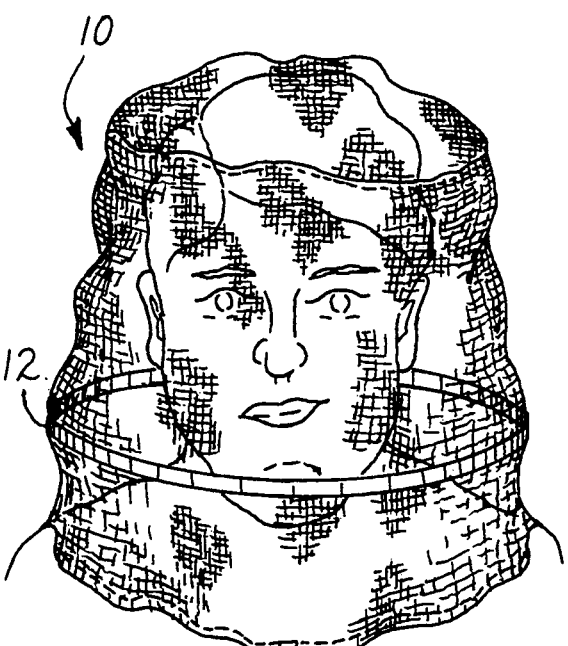
FIG. 4 is a perspective view of the headnet on a wearers head.
Figure 2:
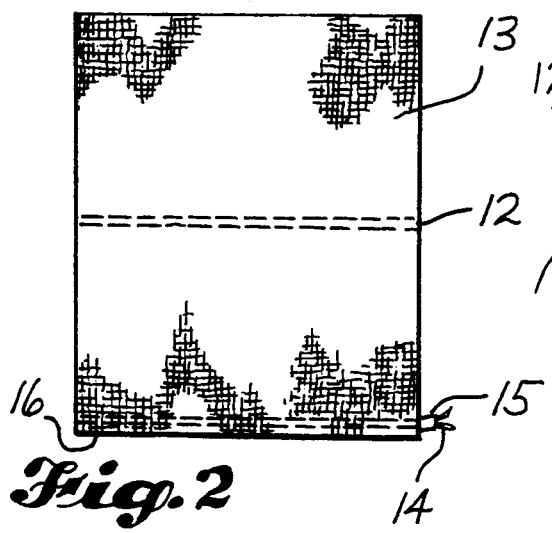
FIG. 2 is a side view of the headnet showing fabric mesh tube with rigid ring at mid point and drawstring at bottom.

The headnet 10 includes an at least substantially cylindrical tubular body 13 constructed of fabric mesh, commonly known as mosquito netting. The top of the fabric tube 13 is closed by a circular top 11, which is made from the same netting material. At a midpoint along the tube 13, a hoop 12 is secured to the tube 13 parallel to the top 11, as can be seen in FIGS. 2 and 4.

Figure 3:
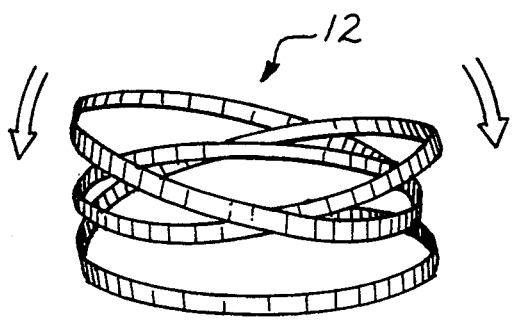
FIG. 3 illustrates the collapsing of the ring.

The hoop 12 is made from a rigid, narrow, flexible material, which may be, for example, metal, plastic, or a similar rigid material. Preferably, the band of material from which the hoop 12 is made has a flat cross section, as can best be seen in FIG. 3. The hoop 12 may be attached to the netting material by suitable means, such as enclosing it in a fold of fabric or otherwise attaching it with clips or stitching it permanently to the fabric. The hoop 12 has a sufficient diameter to permit the headnet 10 to be placed over the head of a wearer, as shown in FIG. 4, and over a brimmed hat or visor cap, as desired. The function of the hoop 12 is illustrated in FIG. 4 and is to keep the mesh fabric away from the wearer's face to protect the wearer's head from insects. The flexible hoop 12 may be collapsed and folded into a substantially flat configuration of three concentric loops of substantially equal diameter, as illustrated in FIG. 3. This reduces the size of the headnet 10 when the headnet 10 is not in use.

In use, the bottom of the tube 13 may be closed around the wearer's neck to prevent entry of insects through the bottom of the tube 13. As illustrated in FIGS. 2 and 4, the closure is a draw string 14 positioned in a loop 15 at the lower end 16 of the tube.

Figure 1:
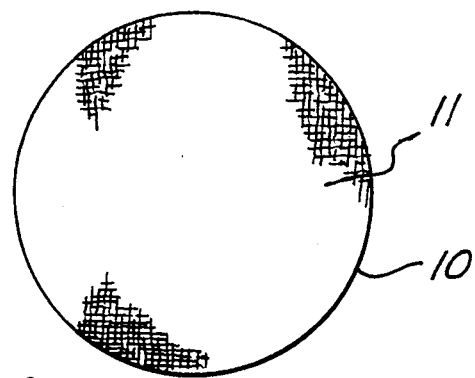
FIG. 1 shows a top view of the subject headnet showing fabric mesh circle which encloses the top.

FIG. 1 illustrates headnet 10 as seen from its top 11. FIG. 2 is a side view of the headnet showing hoop 12 which is fastened to fabric tube 13. The hoop is parallel to the top and located near the mid height of the tube. A drawstring 14 is installed in a loop 15 at the lower end 16 of the tube.

FIG. 3 illustrates the form the hoop takes as it is collapsed. FIG. 4 illustrates the headnet in use.

It is considered to be understandable from this description that the subject invention meets its objective. It provides a headnet which is readily collapsible to a compact shape. It is also considered to be understood that while one embodiment of the subject invention is disclosed herein, other embodiments and modifications of the one described are possible within the scope of the invention which is limited only by the attached claim.

I claim:

1. A headnet for protecting a wearer's head against flying insects, comprising a fabric mesh tube having first and second ends, a fabric mesh top closing said first end, a single loop secured to said mesh tube between said ends parallel to said top and positioned and dimensioned to hold the mesh tube away from a wearer's face, and a closure at the second end of the tube positioned to draw the second end of the tube up around the wearer's neck to prevent entry of insects through the second end; said hoop being made of a material that is sufficiently stiff to hold the tube away from a wearer's face and sufficiently flexible to permit it to be collapsed and formed into a substantially flat configuration of three concentric loops to reduce the size of the headnet when the headnet is not in use.

2. The headnet of claim 1, in which said hoop has a flat cross section.

* * * * *